(12) United States Patent
McCormick et al.

(10) Patent No.: US 6,700,594 B1
(45) Date of Patent: Mar. 2, 2004

(54) METHOD AND ARRANGEMENT FOR REGISTERING COLOR IMAGES

(75) Inventors: Raynard E. McCormick, Lake Oswego, OR (US); Mark A. Bortnem, Newberg, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/273,210

(22) Filed: Oct. 17, 2002

(51) Int. Cl.[7] .......................... B41J 2/385; B41J 2/435; B41J 2/47
(52) U.S. Cl. .................. 347/116; 347/239; 347/234; 347/244
(58) Field of Search .................... 347/116, 234, 347/250, 129, 235, 239, 254, 244; 348/744

(56) References Cited

U.S. PATENT DOCUMENTS

| | | | | |
|---|---|---|---|---|
| 5,212,570 A | * | 5/1993 | Nacman | 358/481 |
| 5,323,183 A | * | 6/1994 | Tateoka et al. | 347/254 |
| 5,489,950 A | * | 2/1996 | Masuda | 348/744 |
| 5,654,607 A | * | 8/1997 | Yamaguchi et al. | 313/495 |
| 5,818,507 A | * | 10/1998 | Genovese | 347/261 |
| 6,055,005 A | | 4/2000 | Appel et al. | 347/116 |
| 6,157,400 A | * | 12/2000 | Genovese | 347/250 |
| 6,181,357 B1 | * | 1/2001 | Hanna | 347/129 |
| 6,198,491 B1 | * | 3/2001 | Honda | 347/129 |
| 6,201,561 B1 | | 3/2001 | Ichikawa | 347/241 |
| 6,310,681 B1 | * | 10/2001 | Taniwaki | 355/55 |
| 6,385,419 B1 | | 5/2002 | Genovese | 399/167 |
| 6,456,309 B1 | * | 9/2002 | Panides et al. | 347/116 |
| 6,552,741 B2 | * | 4/2003 | Nakahara et al. | 347/239 |
| 6,555,810 B1 | * | 4/2003 | Suhara | 250/234 |
| 2002/0075377 A1 | * | 6/2002 | Pawley et al. | 347/234 |
| 2003/0025785 A1 | * | 2/2003 | Nihei et al. | 347/250 |
| 2003/0118380 A1 | * | 6/2003 | Koide | 399/299 |

* cited by examiner

Primary Examiner—Daniel J. Colilla
Assistant Examiner—Wasseem H. Hamdan
(74) Attorney, Agent, or Firm—Maginot, Moore & Beck (57) ABSTRACT

A method includes providing a plurality of clock signals. Each of the clock signals is associated with a respective one of a plurality of printheads in an electrophotographic machine. Each of the clock signals has a respective frequency. The method also includes using the printheads to create a plurality of raster lines. Each printhead is used to create the raster lines with a respective length. The length is dependent upon the frequency of the associated clock signal.

20 Claims, 6 Drawing Sheets

FIG. 6 ized a multi-color image printing device scans a plurality of laser beams across at least one photosensitive member in a scanning direction. The laser beams are modulated, i.e., turned ON and OFF, according to image data or "print data" in order to create latent images in the form of lines on the photosensitive member(s). A common clock signal controls the frequency at which the laser beams are modulated as the laser beams scan across the photosensitive member(s) at a constant speed. Each laser beam creates a latent image on a photosensitive member corresponding to a respective color, such as cyan, magenta, yellow or black.

METHOD AND ARRANGEMENT FOR REGISTERING COLOR IMAGES

FIELD OF THE INVENTION

The subject invention relates generally to image printing devices, and in particular, multi-color image printing devices.

BACKGROUND OF THE INVENTION

Existing printing devices employ a plurality of laser beams to print multi-color images. To this end, a multi-color image printing device scans a plurality of laser beams across at least one photosensitive member in a scanning direction. The laser beams are modulated, i.e., turned ON and OFF, according to image data or "print data" in order to create latent images in the form of lines on the photosensitive member(s). A common clock signal controls the frequency at which the laser beams are modulated as the laser beams scan across the photosensitive member(s) at a constant speed. Each laser beam creates a latent image on a photosensitive member corresponding to a respective color, such as cyan, magenta, yellow or black.

Each laser beam is emitted and scanned by a respective laser scanning unit (LSU), which includes a laser printhead for emitting the laser beam and a scanning unit for scanning the laser beam across a photosensitive surface. Each laser beam passes through at least one lens before impinging upon the photosensitive surface. The lenses through which the laser beams pass have slightly different magnification levels due to manufacturing variations. Moreover, even if two laser beams pass through a same lens, they enter the lens at different points and they exit the lens at different points, resulting in different levels of magnification for the two laser beams.

Each laser beam is reflected off of a rotating polygon mirror in order to scan the laser beam across an imaging member, which can be a photosensitive surface. Each LSU is capable of locking onto a common rotational speed. Each scanning unit has one or more sensors to achieve the rotational speed lock. A start-of-scan sensor and/or an end-of-scan sensor at the edges of the photosensitive surface sense the laser beam as it scans thereacross. The sensor(s) produce a horizontal synchronization signal (HSYNC) which is used to synchronize the start of scanning for each of the laser beams. Thus, all of the laser beams begin their scanning across the photosensitive surface(s) at a same point in the scanning direction.

However, due to the differences in magnification described above, the laser beams conclude their scanning across the photosensitive surface(s) at different points in the scanning direction. That is, the raster lines created by the laser beams have different lengths. This misregistration of the differently colored raster lines causes the differently colored toners to be superimposed upon each other incorrectly, resulting in an inaccurate and visually unappealing toned image on the print medium.

Accordingly, there is a need for a multi-color image printing arrangement that prints raster lines of different colors that have the same length and that can be registered with each other in the horizontal, scanning direction.

SUMMARY OF THE INVENTION

The above needs, as well as others, are fulfilled by providing a method and arrangement for adjusting the lengths of raster lines produced by a plurality of printheads. The adjustment can be performed for each laser printhead independently such that each printhead produces registered raster lines of an equal length. A separate clock signal is provided for each printhead to control the frequency at which each printhead is modulated according to print data. Adjustments of the frequency of the clock signal result in changes in the time period required for one raster line of print data to be output by the printhead. Since the laser beam is scanned across the photosensitive surface at a constant rate of speed, a change in the time period required for one raster line of print data to be output by the printhead results in a change in the length of the raster line.

In embodiments of the invention, a method includes providing a plurality of clock signals. Each of the clock signals is associated with a respective one of a plurality of printheads in an electrophotographic machine. Each of the clock signals has a respective frequency. The method also includes using the printheads to create a plurality of raster lines. Each printhead is used to create the raster lines with a respective length. The length is dependent upon the frequency of the associated clock signal.

In other embodiments of the invention, an arrangement for use in an electrophotographic machine includes a clock signal source and a plurality of printheads. The clock signal source is configured to provide a plurality of clock signals, with each of the clock signals having a respective frequency. Each printhead is associated with a respective one of the clock signals. Each printhead is configured to print raster lines having lengths dependent upon the frequency of the associated clock signal.

In other embodiments of the invention, a method includes modulating a plurality of light beams in an electrophotographic machine. The modulating of each light beam is performed at a respective one of a plurality of modulating frequencies. The light beams are scanned across at least one photosensitive surface to thereby produce a plurality of raster lines. Each raster line has a respective length. The method also includes adjusting the length of at least one of the raster lines by changing the modulating frequency of at least one of the light beams such that at least two of the modulating frequencies are unequal.

As a result, the lengths of the raster lines produced by each of the printheads can be made to be equal. Thus, it is possible to register each color of toner relative to each of the other colors in the horizontal, scanning direction.

The above discussed features and advantages, as well as others, may be readily ascertained by those of ordinary skill in the art by reference to the following detailed description and accompanying drawings.

DETAILED DESCRIPTION

Figure 1:
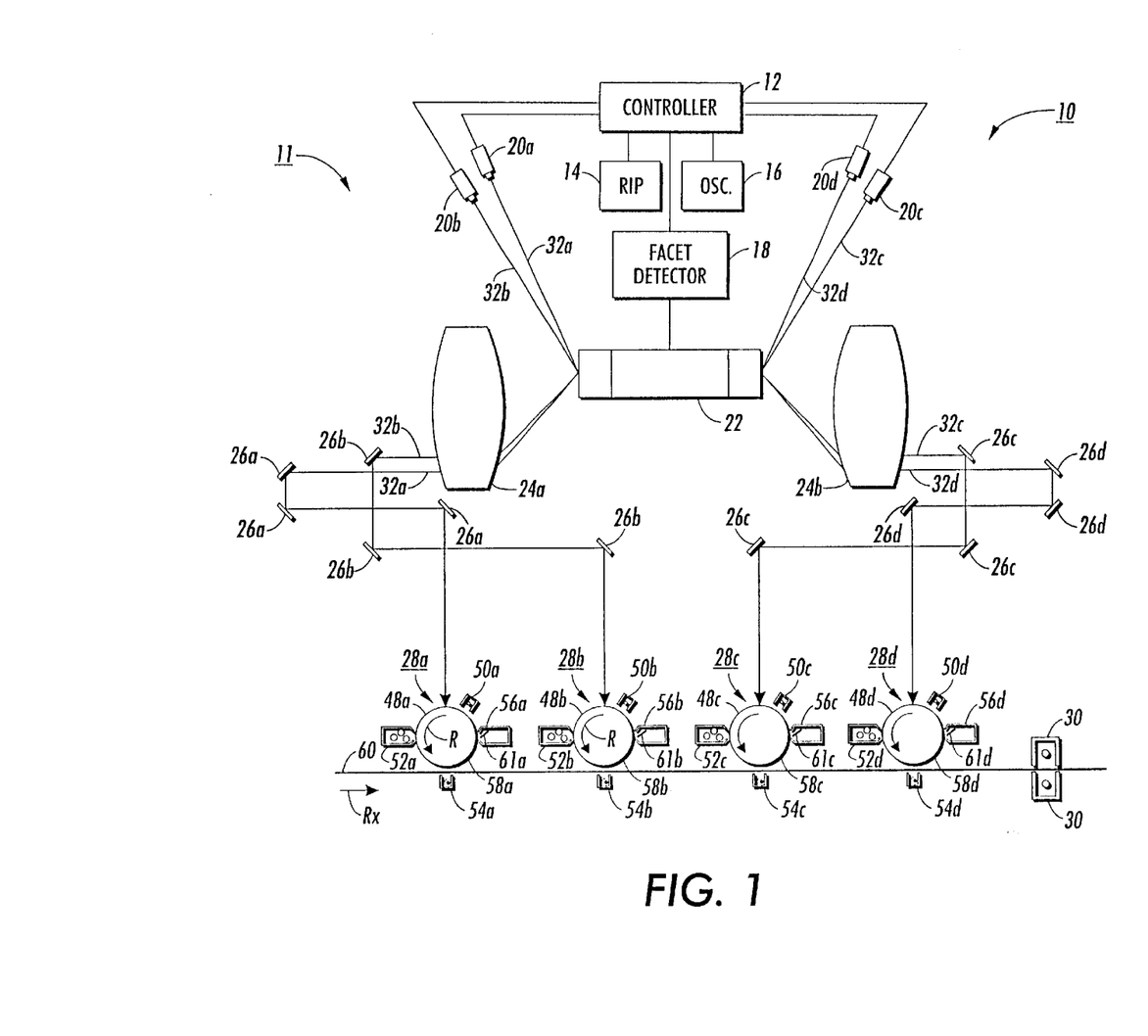
FIG. 1 shows a schematic view of an exemplary electrophotographic system that includes an arrangement according to embodiments of the subject invention.

FIG. 1 shows an exemplary arrangement 10 for use in an electrophotographic printer 11 to create raster lines according to embodiments of the subject invention. The arrangement 10 includes a controller 12, a raster image processor (RIP) 14, an external oscillator 16, a facet detector 18, laser printheads 20a, 20b, 20c, 20d, a rotating polygon mirror 22 having six facets, FΘ lenses 24a, 24b, mirrors 26a, 26b, 26c, 26d, image forming units 28a, 28b, 28c, 28d, and a fixing unit 30. In general, the controller 12 modulates laser printheads 20a, 20b, 20c, 20d dependent upon print data to emit laser beams 32a, 32b, 32c, 32d which are reflected off of polygon 22, transmitted through lenses 24a, 24b, and reflected off of mirrors 26a, 26b, 26c, 26d onto image forming units 28a, 28b, 28c, 28d. The laser printheads 20a, 20b, 20c, 20d produce cyan, magenta, yellow and black images, respectively. It will become evident from the following discussion that embodiments of the subject invention are equally well suited for use in a wide variety of printing and copying systems, and therefore are not limited in application to the particular system(s) shown and described herein.

Figure 2:
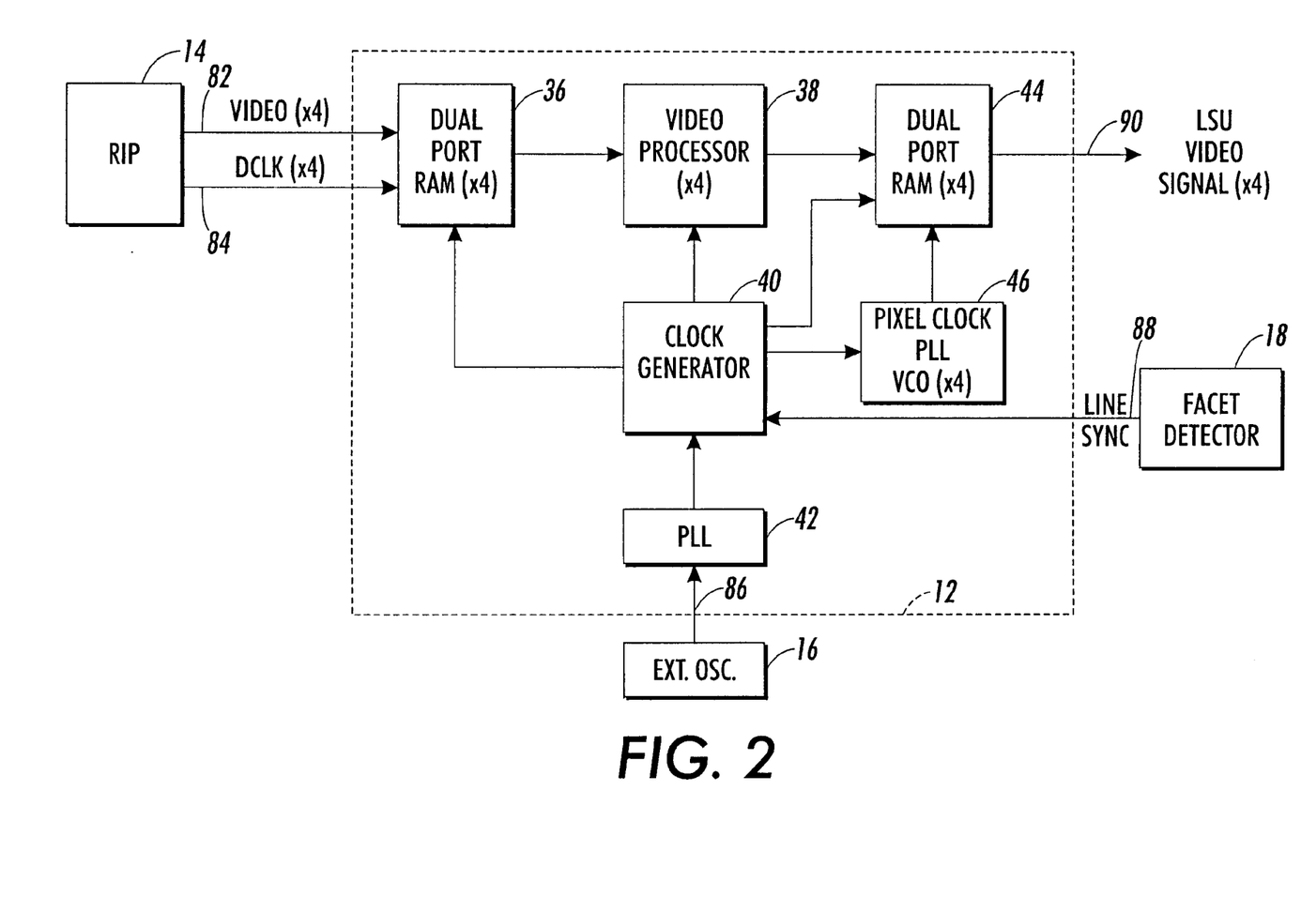
FIG. 2 shows a block diagram of the controller of the electrophotographic system of FIG. 1.

The controller 12 is shown in more detail in FIG. 2, which is a block diagram of an exemplary embodiment of the controller 12. The controller 12 includes a first dual port random access memory (RAM) 36, a video processor 38, a clock generator 40, a phase-locked loop (PLL) 42, a second dual port RAM 44, and a pixel clock 46. The clock generator 40 can be packaged in the form of an application-specific integrated circuit (ASIC).

Referring back to FIG. 1, the structure and operation of the image-forming unit 28a will be described in detail. Since the structure and operation of the other image forming units 28b, 28c, 28d are substantially identical to that of image forming unit 28a, such structure and operation will not be given in detail herein.

The structure of the image forming unit 28a includes an imaging member in the form of a photoreceptor 48a, a corona-generating first charger 50a, a developer 52a, a second charger 54a and a cleaner 56a. The photoreceptor 48a is in the form of a photosensitive or photoconductive drum that has an outer surface 58a to be scanned. The outer surface 58a of the photoreceptor 48a is typically constructed of a photoconductive material. This photoreceptor 48a is constructed to be rotated at a fixed speed (in a direction indicated by an arrow R) by a driving part (not shown). In this respect, the driving of the photoreceptor 48a is not limited to rotary driving, but step-driving in synchronism with the scanning can be used. Downstream of the developer 52a along the rotating direction, a sheet 60 is in contact, and is adapted to move in a direction indicated by an arrow Rx, or process direction, in coincidence with the rotation (arrow R) of the photoreceptor 48a.

The operation of the image forming unit 28a will now be described. Initially, a portion of the photoreceptor 48a passes by the first charger 50a which charges the photoreceptor 48a to a relatively high, substantially uniform potential, such as −900 volts. Next, the charged photoconductive outer surface 58a is rotated to an exposure station where the charged photoconductive outer surface 58a receives the modulated light beam 32a corresponding to information derived by the RIP 14. The modulated light beam 32a impinges on the outer surface 58a of the photoreceptor 48a. The beam 32a illuminates the charged portion of the photoreceptor 48a to form an electrostatic latent image charged to a potential of approximately −200 volts, for example.

After the electrostatic latent images have been recorded on the photoreceptor 48a, the drum advances such latent images to the cyan developer 52a. The developer 52a can suitably be of a type generally referred to in the art as magnetic brush development units. Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. The developer material is charged to a potential of −600 volts, for example. Development is achieved by bringing the brush of developer material into contact with the photoconductive outer surface 58a. The developer material (charged to −600 volts) adheres to the latent image (charged to −200 volts) and is repelled by the remainder of the photoconductive outer surface 58a (charged to −900 volts). Developer 52a thereby applies cyan toner particles to the photoconductive outer surface 58a.

After the toner has been deposited on the photoreceptor 48a, the drum advances the toner to the second charger 54a. The sheet 60 is interposed between the second charger 54a and the photoreceptor 48a. The second charger 54a has some large positive potential, such as 500 volts for example, which attracts the negatively charged toner. Thus, the toner is transferred from the photoconductive surface 58a to the sheet 60.

The final processing device in the direction of movement of the drum 48a, as indicated by arrow R, is a photoreceptor cleaner 56a. A rotatably mounted fibrous brush 61a can be positioned in the cleaner 56a and maintained in contact with the photoreceptor 48a to remove residual toner particles remaining after the transfer operation.

The operation of the overall printer 11 will now be described with reference to FIG. 1. The four laser printheads 20a, 20b, 20c, 20d respectively expose the four photoreceptors 48a, 48b, 48c, 48d to light to thereby record four latent images which correspond to the signals transmitted from the RIP 14. The photoreceptor 48a, 48b, 48c, 48d exposure may be sequenced in any order, depending on any number of printer design considerations. The latent image on the photoreceptor 48a is developed with cyan developer material; the latent image on the photoreceptor 48b is developed with magenta developer material; the latent image on the photoreceptor 48c is developed with yellow developer material; and the latent image on the photoreceptor 48d is developed with black developer material. The photoreceptors 48a, 48b, 48c, 48d cooperate with their associated second chargers 54a, 54b, 54c and 54d to transfer these developed images to the sheet 60 in superimposed registration with one another in order to form a multicolored image on the sheet 60. This multicolored image is then fused or melt-fixed to the sheet 60 by the fixing unit 30 provided at the downstream side in the conveying direction Rx. Thus, a four-color image is formed on the sheet 60. Thereafter, the sheet 60 is advanced by a pair of rolls (not shown) to a catch tray (not shown) for subsequent removal therefrom by the machine operator.

The scanning of a laser beam to produce a raster line or scan line will now be described with reference to FIG. 3. The operation of laser printhead 20a to produce a raster line on photosensitive drum 48a is used in FIG. 3 as a representative example. The operation of the other laser printheads 20b, 20c, 20d to produce raster lines on photosensitive drums 48b, 48c, 48d, respectively, is substantially similar to that of laser printhead 20a and will not be described in detail herein in order to avoid undue repetition.

The laser printhead 20a illuminates the charged outer surface 58a of the photoreceptor 48a via the polygon 22, the lens 24a and the mirrors 26a. As the rotating polygon mirror 22 rotates to change the angle of reflection of the laser beam 32a, the laser printhead 20a illuminates or scans the charged portion of the photoreceptor 48a at a rate between 300 and 4800 pixels per inch to produce a scan line or raster line such as raster line 72.

The rotation of the polygon 22 must be synchronized with the output of the laser printhead 20a. That is, the facets of the polygon 22 must be in the correct position when the laser printhead 20a emits a raster line of data so that the raster line is correctly positioned on the surface 58a of photosensitive drum 48a. It is also desirable for the four laser printheads 20a, 20b, 20c, 20d to begin each image with the same facet in order to minimize misalignment of the superimposed toner images on the sheet 60.

Facet synchronization is achieved using the facet detector 18 to detect when a predetermined facet is in position to be illuminated by the laser printhead 20a. The facet detector 18 applies a synchronizing signal to the controller 12 that causes the controller to synchronize modulation of the laser beam 32a with the facets. Since the cyan image has the same number of raster lines as the magenta, yellow and black images, beginning the four images with the same facet results in corresponding scan line being produced with the same facet, thereby improving alignment between the colors. The facet detector 18 can also be used to ensure that the first pixels of a raster line for each of the laser printheads 20a, 20b, 20c, 20d are aligned in the process direction R, i.e., are at the same position in a scanning direction 68, so that each raster line begins with a same left margin.

Figure 3:
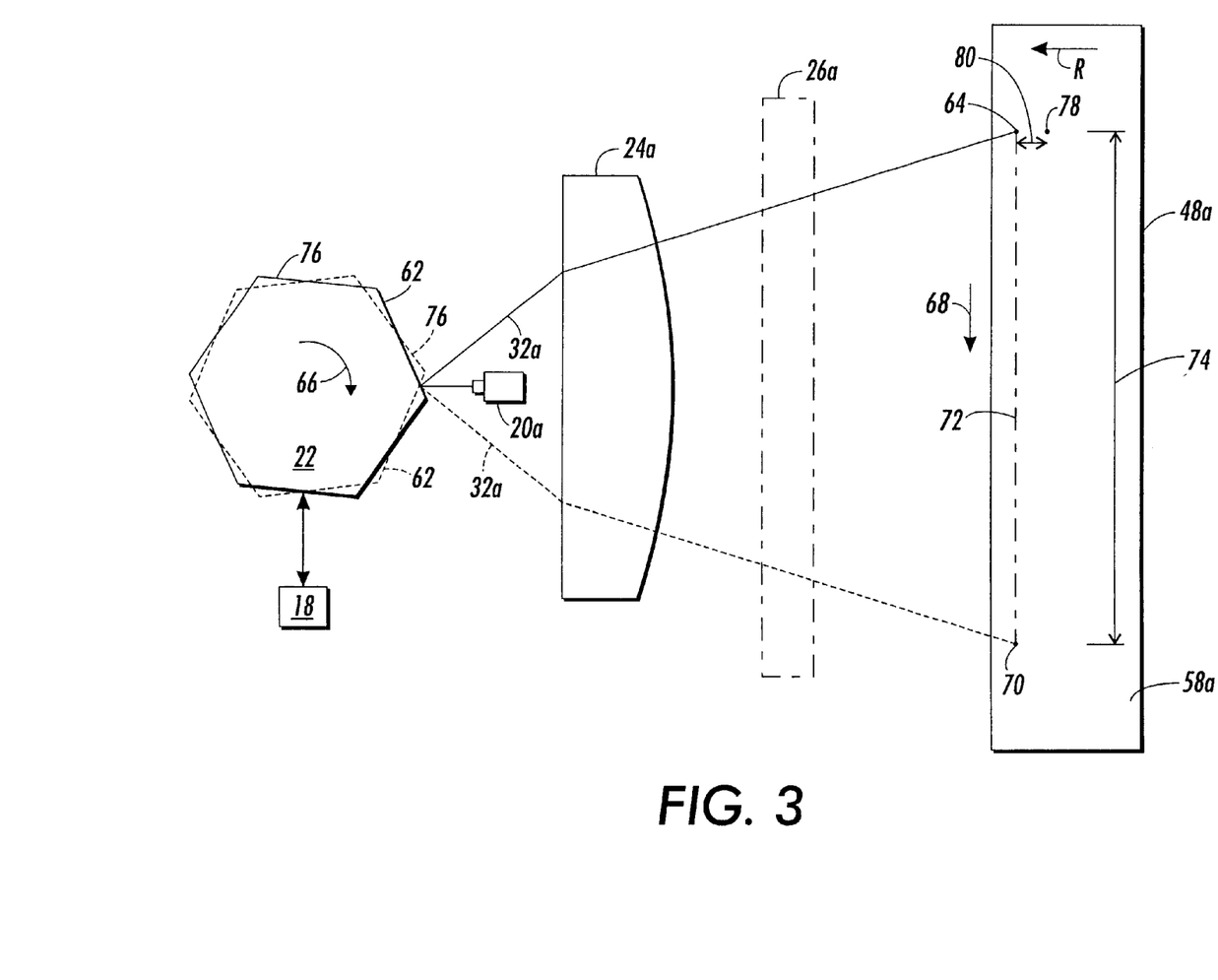
FIG. 3 shows a plan view of a laser printhead, the polygon mirror, a lens, a mirror assembly, and a photosensitive drum of the electrophotographic system of FIG. 1.

When the polygon 22 is in the position indicated by solid lines in FIG. 3, as detected by the facet detector 18 or by some other sensor, the laser printhead 20a is turned on and has its output modulated in accordance with image data. The laser beam 32a is reflected off a facet 62 of the polygon 22, is refracted by the lens 24a, and is directed by mirrors 26a (depicted only schematically in FIG. 3) onto the photoconductive outer surface 58a of photoreceptor 48a at a start-of-scan point 64. As the polygon 22 rotates in the direction indicated by arrow 66, the laser beam 32a is scanned across photoreceptor 48a in the scanning direction 68 as the laser beam 32a is modulated.

When the polygon 22 has rotated to the position indicated by dashed lines in FIG. 3, as detected by the facet detector 18 or by some other sensor, the laser beam 32a has arrived at an end-of-scan point 70, having produced a raster line 72 with a length 74. The laser printhead 20a is then turned off until the next facet 76 has rotated to a position whereat a new scan line can be started. More particularly, the laser printhead 20a is turned off until the next facet 76 arrives at the former position of facet 62 that is indicated in solid lines in FIG. 3. At this point, the laser printhead 20a is turned back on and the laser beam 32a impinges upon the photoreceptor 48a at a second start-of-scan point 78. The second start-of-scan point 78 is disposed at a same position as the first start-of-scan point 64 along the scan direction 68. However, the second start-of-scan point 78 is displaced from the first start-of-scan point 64 along the process direction R by a distance 80 determined by the speed of the photoconductive surface 58a and by the rotational speed of the polygon 22. The next raster line is scanned while the laser beam 32a is modulated with the next raster of image data. Thus, the process repeats until the laser beam 32a has been modulated with all of the available image data.

It should be noted that a facet detector is not absolutely required. For example, the polygon 22 might be rotated using either a stepper motor or a synchronized AC motor. By tracking the signals to the motor, such as by counting pulses or by counting input cycles, and by taking into consideration the number of facets on the polygon 22, it is possible to know when a particular facet is in position to be illuminated by the laser printhead.

In operation, the controller 12 obtains rasterized image data from the RIP 14 which can receive corresponding unrasterized image data from a host computer (not shown) or another source of image data, such as a scanner. The RIP 14 transmits the image data for each of the four laser printheads 20a, 20b, 20c, 20d (as indicated by "(x 4)"in FIG. 2) on video lines 82 to the dual port RAM 36. The RIP 14 also transmits a data clock signal for each of the four laser printheads 20a, 20b, 20c, 20d on data clock lines 84 to the dual port RAM 36. The data clock signal defines the clock-out rate of the data that is being transmitted to the dual port RAM 36. This data clock signal causes the dual port RAM 36 to properly store the image data in memory locations within the RAM 36.

The dual port RAM 36 transmits, and the video processor 38 receives, the image data for each of the four laser printheads 20a, 20b, 20c, 20d at a rate equal to the frequency of the output of the clock generator 40. In one embodiment, the clock generator 40 has a center frequency of approximately 115.93 MHz. The video processor 38 also outputs the image data at the frequency of the clock generator 40.

The clock generator 40 is driven by the phase-locked loop 42, which, in turn, is driven by the oscillator 16. The external oscillator 16 provides an input oscillating signal on a line 86 to the phase-locked loop 42. In order to minimize electromagnetic interference (EMI), the frequency of the oscillating signal is less than the frequency of the PLL signal. The PLL 42 outputs the higher frequency within the controller 12, where EMI is less of a concern. In one embodiment, the output frequency of the external oscillator 16 is one-sixth the frequency of the PLL signal. In the exemplary embodiment described herein, the frequency of the external oscillator 16 is 25.76 MHz. As a consequence, the frequency of the PLL 42 is 154.56 MHz.

The phase-locked loop (PLL) 42 transmits the PLL signal to the clock generator 40. The frequency of the PLL 42 signal determines the frequency of the output of the clock generator 40. In one embodiment, the frequency of the PLL 42 signal is eight times the center frequency of the clock generator 40. That is, the frequency of the PLL 42 signal is approximately 8×19.56 MHz, or 154.56 MHz. The video processor 38 transmits eight bits of video data simultaneously for each of the four colors on eight different video signals. Data on each of the eight different video signals is controlled by the clock generator 40. In a similar embodiment, the video processor 38 may also use the PLL 42 clock to synchronize the simultaneous movement of eight bits of video data for each of the four colors.

The facet detector 18 transmits a line synchronization signal to the clock generator 40 on a line 88. The clock generator 40 uses the line synchronization signal to determine the correct timing of the image data output from the video processor 38 so that the flow of image data is synchronized with the rotation of the polygon 22. The clock generator 40 then adjusts the image data output from the video processor 38 so that it has the correct timing. That is, the image data output from the video processor 38 can be delayed when necessary so that the image data is synchronized or in phase with the rotation of the polygon 22.

The dual port RAM memory device 44 receives the image data output of the video processor 38. The clock generator 40 outputs a data clock signal to the dual port RAM 44 that specifies the rate or common transmission speed at which the image data for all four colors is being transmitted from the video processor 38. At the rate specified by the data clock signal, the dual port RAM 44 receives and stores the image data in memory locations within the RAM 44. In one embodiment, the RAM 44 includes a parallel to serial converter for converting the eight bits of parallel image data that the RAM 44 receives simultaneously from the video processor 38 for each of the four colors into serial image data for modulating each of the four laser printheads 20a, 20b, 20c, 20d. The serial image data is fed by RAM 44 onto lines 90 as four laser scanning unit (LSU) video signals, each of which is transmitted to a respective one of the four laser printheads 20a, 20b, 20c, 20d at a respective write speed.

The controller 12 in accordance with embodiments of the subject invention includes a pixel clock 46 that can transmit a clock signal with a separately adjustable frequency for each of the four colors cyan, magenta, yellow and black, as indicated by the "(x 4)" in block 46 of FIG. 2. The external oscillator 16, the clock generator 40, the PLL 42, and the pixel clock 46 together form several independent clock signal sources. The pixel clock 46 includes multiple internal phase-locked loops with voltage controlled oscillators, as is well known in the art.

Each of the four different clock signals output by the pixel clock 46 determines the rate of image data transmission for a respective one of the four laser printheads 20a, 20b, 20c, 20d. This is in contrast to known electrophotographic machines in which a single pixel clock signal is used to determine a rate of image data transmission that is used equally for each of the laser printheads in the machine. That is, in known machines, the output of each of the laser printheads is modulated at a same rate. Embodiments of the subject invention provide a respective clock signal with an adjustable frequency for each of the laser printheads, thus enabling the output of each of the laser printheads to be modulated at a different rate. By separately adjusting the rate of modulation of the output of each of the laser printheads, it is possible to separately adjust the lengths of the raster lines produced by each of the laser printheads. Further, is it possible to separately adjust the rate of modulation of the output of each of the laser printheads such that the lengths of the raster lines produced thereby are equal.

In one embodiment, the frequencies of the four signals from the pixel clock 46 are all less than or equal one-eighth to the frequency of the output of the clock generator 40. Thus, the print speeds are all less than or equal to the common transmission speed determined by the frequency of the output of the clock generator 40. If the frequency of one of the signals from the pixel clock 46 were greater than eight times the frequency of the output of the clock generator 40, the data would be transmitted from the RAM 44 to the corresponding laser printhead faster than the RAM 44 receives the data from the video processor 38. Although such a condition would be sustainable in the short term, eventually the RAM 44 would run out of data to transmit to the corresponding printhead. The differences in the frequencies between the output of the clock generator 40 and the signals from the pixel clock 46 are small enough that the RAM 44 always maintains storage space for additional data from the video processor 38 and never completely fills up or overflows.

Figure 4A:
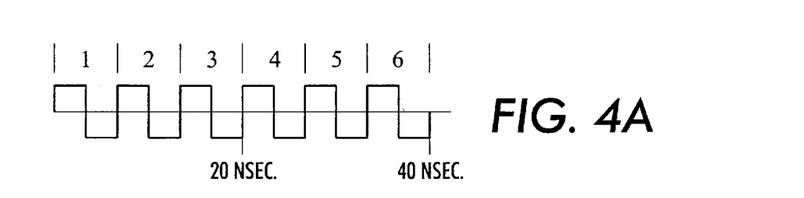
FIG. 4A shows a portion of an exemplary clock signal from the pixel clock of FIG. 3.

The relationship between the frequency of one of the output signals of the pixel clock 46 and the length of a raster line produced by a corresponding printhead will now be described with reference to FIGS. 4A–4D. FIG. 4A shows six cycles of an exemplary clock signal from the pixel clock 46. The six cycles occur over a time span of 40 nanoseconds, and thus the clock signal has a frequency of 150 MHz. The output of the laser printhead that is clocked by the pixel clock 46 is modulated in terms of turning picture elements, or "pixels", ON and OFF with each cycle of the pixel clock 46. That is, each bit of the image data corresponds to a respective cycle of the pixel clock 46. Turning a pixel ON means that the laser printhead produces a laser light beam output while traversing an addressed pixel location on the photoconductive surface, i.e., while the polygon 22 scans the laser beam across the photoconductive surface for the time duration of the corresponding pixel clock cycle. Turning a pixel OFF means that the laser printhead does not produce a laser light beam output while traversing the pixel location on the photoconductive surface.

Figure 4B:
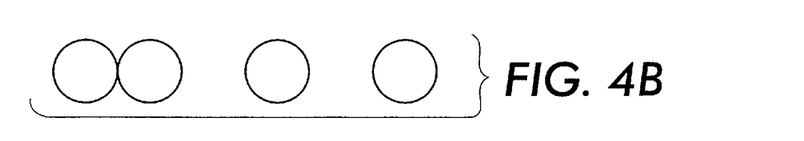
FIG. 4B shows a portion of a raster line printed using the clock signal of FIG. 4A.

FIG. 4B shows pixels created by a laser printhead that is clocked by the six cycles of the pixel clock signal of FIG. 4A. In the example of FIG. 4B, the first, second, fourth and sixth bits of the image data are logic "1's ", and the corresponding pixels are turned ON by the laser printhead, while the third and fifth bits of the image data are logic "0's " and the corresponding pixels are turned OFF by the laser printhead.

Figure 4C:
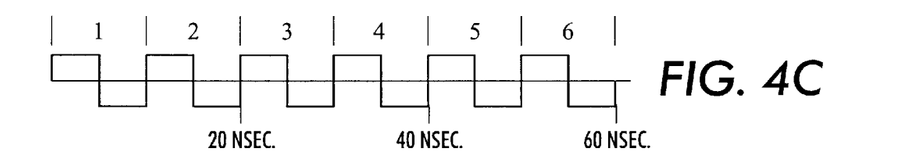
FIG. 4C shows a portion of another exemplary clock signal from the pixel clock of FIG. 3.
Figure 4D:
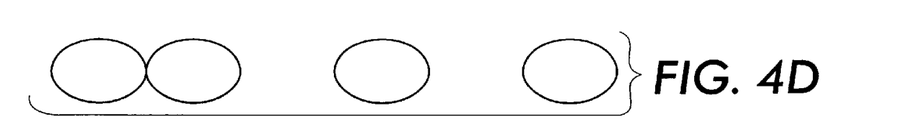
FIG. 4D shows a portion of a raster line printed using the clock signal of FIG. 4C.

FIG. 4C shows six cycles of another exemplary clock signal from the pixel clock 46 having a lower frequency. The six cycles occur over a time span of 60 nanoseconds, and thus the clock signal has a frequency of 100 MHz. Although the pixel clock 46 does not typically have a variation of output frequencies as large as 100–150 MHz, these frequencies are used in FIGS. 4A–4D for ease of illustration. FIG. 4D shows pixels created by a laser printhead that is clocked by the six cycles of the pixel clock signal of FIG. 4C. The pixels of FIG. 4D correspond to the same six bits of image data that correspond to the pixels of FIG. 4B. As can be seen in a comparison of FIGS. 4B and 4D, the pixels of FIG. 4D are wider than the pixels of FIG. 4B, which is due to the frequency of the pixel clock signal of FIG. 4C being less than the frequency of the pixel clock signal of FIG. 4A.

More particularly, each of the pixels of FIG. 4D is created over a time duration of 10 nanoseconds. In contrast, each of the pixels of FIG. 4B is created over a time duration of approximately 6.7 nanoseconds. Since the polygon 22 rotates at a constant speed regardless of the frequencies of the pixel clock signals, the laser beams are scanned with a substantially fixed surface speed over the photoconductive surface. Further, since the scanning speed of the laser beam is constant, the width of each individual pixel is dependent upon the time duration of the corresponding pixel clock cycle. The pixels can be uniformly compressed by increasing the pixel clock frequency, and, conversely, the pixels can be uniformly stretched by decreasing the pixel clock frequency. The image data or "print data" is fed to the printhead at a print speed proportional to the frequency of the associated clock signal.

The lengths of raster lines are dependent upon the widths of the individual pixels that make up the raster lines. The light beams are scanned across the photosensitive surfaces only while being modulated to create the individual pixels. Each raster line has a predetermined number of pixels. On a larger scale, since the laser beams are scanned across the photosensitive surfaces at a substantially constant speed, the lengths of the raster lines are proportional to the time span over which the predetermined number of pixels are created. With each pixel being created during a corresponding pixel clock cycle, or during some other number of corresponding pixel clock cycles, the time span required to create the predetermined number of pixels of a raster line is inversely proportional to the frequency of the pixel clock signal. Thus, the lengths of the raster lines are inversely proportional to the frequency of the pixel clock signal.

The widths of the pixels can be varied in order to vary the overall lengths of the raster lines that the pixels collectively form. Thus, by adjusting the widths of the pixels, the raster lines can be provided with equal lengths such that the raster lines are in alignment with each other.

Referring again to FIGS. 1 and 2, each of the four laser printheads 20*a*, 20*b*, 20*c*, 20*d* is clocked by a respective one of the pixel clock signals from the pixel clock 46. Since the frequencies of each of the pixel clock signals are individually adjustable by the controller 12, and the lengths of the raster lines produced by the laser printheads are dependent upon the frequencies of the associated pixel clock signals, the lengths of the raster lines produced by each of the four laser printheads 20*a*, 20*b*, 20*c*, 20*d* are also individually adjustable. More particularly, the lengths of the raster lines produced by each of the four laser printheads 20*a*, 20*b*, 20*c*, 20*d* are individually adjustable by adjusting the frequencies of the associated pixel clock signals.

Figure 5:
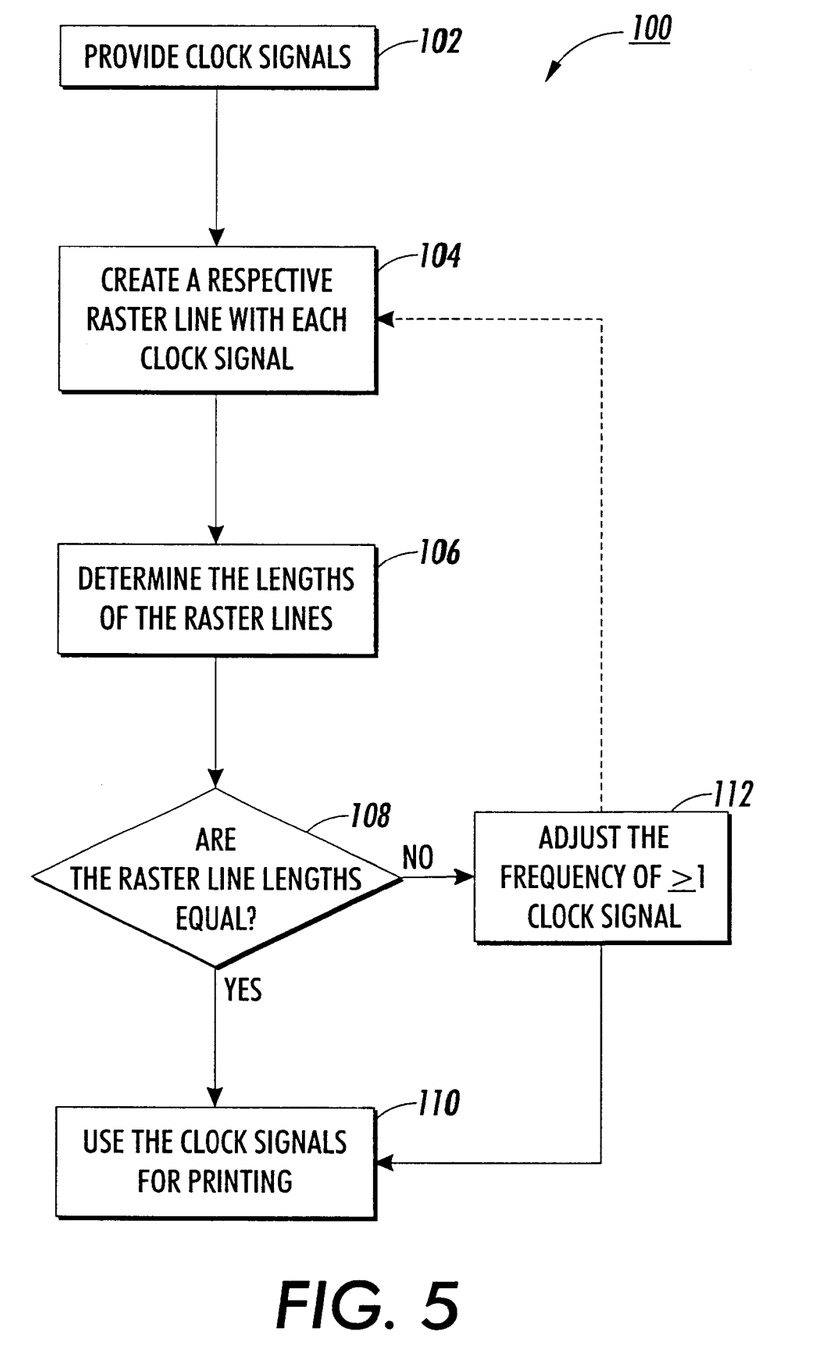
FIG. 5 is a flow diagram of one exemplary method according to embodiments of the subject invention.

FIG. 5 shows a flow diagram 100 of exemplary operations executed in accordance with embodiments of the subject invention. In step 102, four clock signals are provided by the pixel clock 46. The RAM 44 feeds print data to the four laser printheads 20*a*, 20*b*, 20*c*, 20*d* at respective print speeds corresponding to the four clock signals, respectively. The printheads then create respective test raster lines on the respective photoreceptors 48*a*, 48*b*, 48*c*, 48*d* with the print data at the print speeds specified by the four clock signals (step 104).

The lengths of the raster lines are measured or determined in step 106. The lengths of the raster lines are affected by the slightly different magnification levels of the lenses 24*a*, 24*b*. Although the lenses 24*a*, 24*b* can have the same design, their magnification levels may be different due to manufacturing variations. Moreover, even if two laser beams are refracted by the same lens, as are laser beams 32*a* and 32*b* in FIG. 1, they may be magnified at slightly different levels due to entering the lens at different points and exiting the lens at different points. The lengths of the raster lines can be determined by sensors (not shown) on each of the photoreceptors 48*a*, 48*b*, 48*c*, 48*d* which sense the locations of the ends of the raster lines. Alternatively, the raster lines can be transferred from the photoreceptors 48*a*, 48*b*, 48*c*, 48*d* to the sheet 60. A human operator can then inspect the sheet 60 and visually determine the relative lengths of the raster lines. In any case, it is determined whether the lengths of the raster lines are equal (step 108).

If the raster line lengths are equal, no adjustments are necessary and the clock signals used to create the raster lines can be used in printing (step 110). If the raster line lengths are not equal, an adjustment can be made to the length of at least one of the raster lines by adjusting the frequency of the corresponding pixel clock signal(s) (step 112). As a numerical example, assume that, due to magnification differences, a cyan raster line is found to be 0.4 mm shorter than the magenta, yellow and black raster lines. That is, the cyan raster line is physically shorter even though all four of the raster lines are produced with equal amounts of print data (same number of bits). At a print resolution of 2400 dots per inch (dpi), the 0.4 mm difference can be translated into a difference of 37.8 pixels. Further assume that the magenta, yellow and black raster lines have lengths of approximately 19,712 pixels across a letter-sized page. If the cyan raster line were created with a pixel clock modulation frequency of 115.93 MHz, then an adjusted pixel clock modulation frequency for the cyan printhead 20*a* can be calculated as:

(115.93 MHz)(19,712−37.8)/19,712 =115.70 MHz.

This adjusted pixel clock frequency of 115.70 MHz for the cyan printhead 20*a* can be expected to result in a cyan raster line that is of the same length as the magenta, yellow and black raster lines, and can thereafter be used to print cyan raster lines (step 110). Thus, the clock signal source is a means to compensate the lengths of the raster lines for the different levels of magnification provided by the lenses 24*a*, 24*b*.

It is also possible to confirm that the adjustment to the pixel clock frequency has the desired effect before using the adjusted pixel clock frequency for printing. More particularly, after the adjustment to the pixel clock frequency, test raster lines can again be created using the pixel clock frequencies as they stand after the adjustment has been made (step 104), as indicated by the dashed arrow in FIG. 5. The lengths of the raster lines are again determined (step 106) to verify that they are now all equal (step 108). If the raster line lengths are still not all equal, the frequency of at least one of the pixel clocks is again adjusted (step 112). The above-described process continues until it is determined that the lengths of the raster lines are all equal, at which point the pixel clock signals are ready to be used for printing (step 110).

In another embodiment, a series of test raster lines are created over a range of pixel clock frequencies. From inspecting these test raster lines, a human operator or sensors within the machine select pixel clock frequencies that produce raster lines of desired lengths. These selected pixel clock frequencies are then used for printing.

Figure 6:
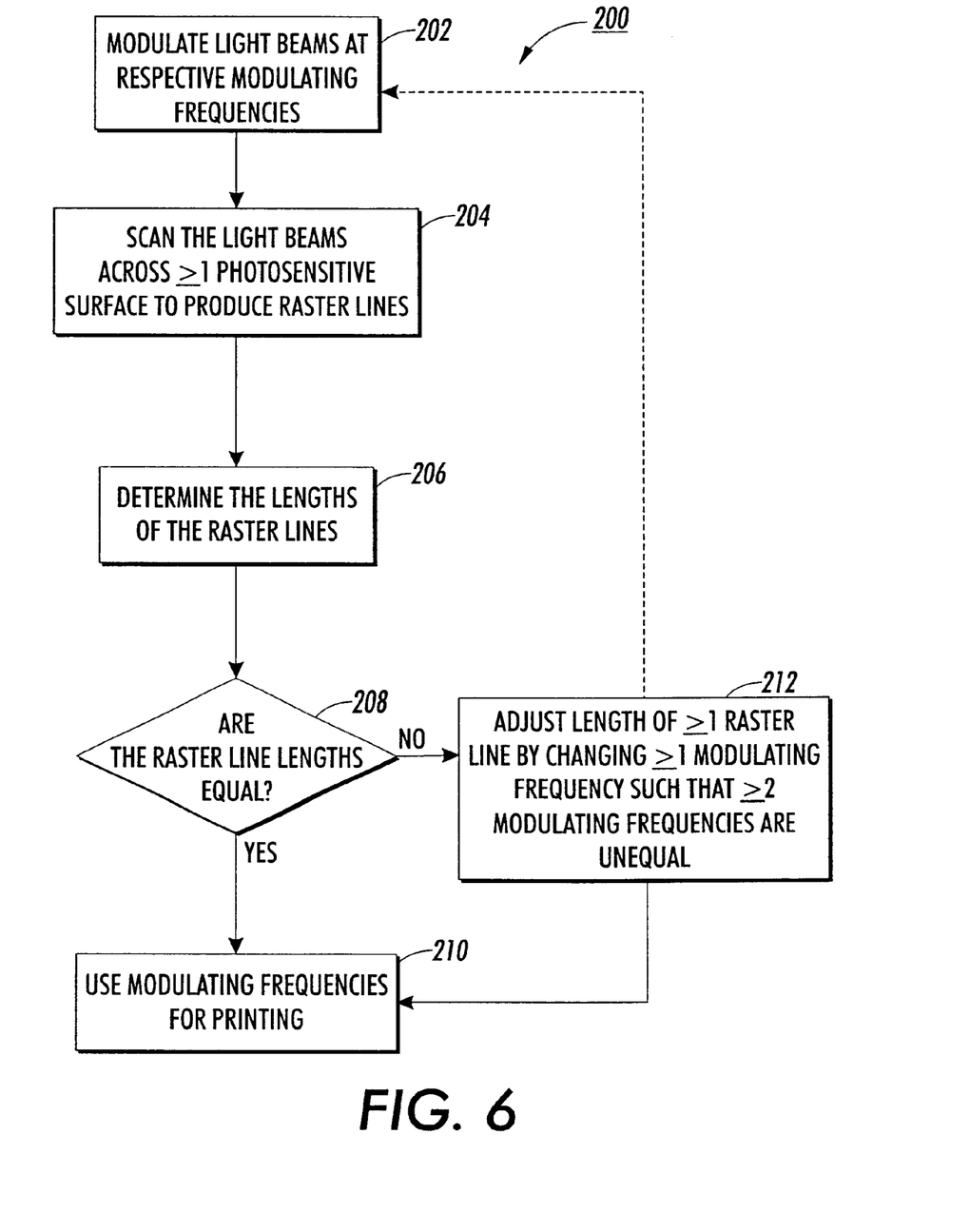
FIG. 6 is a flow diagram of another exemplary method according to embodiments of the subject invention.

FIG. 6 shows a flow diagram 200 of further exemplary operations executed in accordance with embodiments of the subject invention. In step 202, light beams from laser printheads 20*a*, 20*b*, 20*c*, 20*d* are modulated at respective modulating frequencies from pixel clock 46 (step 202). The light beams are then reflected off of a rotating polygon 22 in order to scan the light beams across the photoreceptors 48*a*, 48*b*, 48*c*, 48*d* and thereby produce four raster lines (step 204). The lengths of the raster lines are measured or determined by sensors or by a human operator (step 206), as described above with reference to step 106 of FIG. 5. It is then determined whether the lengths of the raster lines are equal (step 208).

If the raster line lengths are equal, then no adjustments are necessary and the modulating frequencies used to create the raster lines can be used in printing (step 210). If the raster line lengths are not equal, then an adjustment can be made to the length of at least one of the raster lines by changing the corresponding modulating frequency such that at least two of the modulating frequencies are unequal (step 212). By calculation methods similar to those described with reference to step 112 of FIG. 5, the modulating frequencies can be adjusted such that all of the raster lines are of the same length, and these adjusted modulating frequencies can be used for printing (step 210).

It is also possible to confirm that the change to the modulating frequency has the desired effect before using the adjusted modulating frequency for printing. More particularly, after the change to the modulating frequency, light beams can again be modulated at adjusted modulating frequencies (step 204), as indicated by the dashed arrow in FIG. 6. The test light beams are again scanned across the photoreceptors 48a, 48b, 48c, 48d to produce raster lines (step 204), and the lengths of the raster lines are again determined (step 206) to verify that they are now all equal (step 208). If the raster line lengths are still not all equal, at least one of the modulating frequencies is again adjusted (step 212). The above-described process continues until it is determined that the lengths of the raster lines are all equal, at which point the modulating frequencies are ready to be used for printing (step 210).

It will be appreciated that the above described embodiments are merely illustrative, and that those of ordinary skill in the art may readily devise their own implementations that incorporate the principles of the subject invention and fall within the spirit and scope thereof For example, the subject invention can be applied to an electrophotographic copier as well as an electrophotographic printer. In a digital electrophotographic copier, an original image is scanned, stored in digital form in memory, and then transmitted to at least one laser scanning unit for reproduction on a print medium. Embodiments of the subject invention can be used to process the scanned image data before it is stored in the memory, i.e., on the "input side". Alternatively, embodiments of the subject invention can be used to process the scanned image data after it is retrieved from the memory and before it is transmitted to the at least one laser scanning unit, i.e., on the "output side".

What is claimed is:

1. A method comprising:
   providing a plurality of clock signals, each of the clock signals being associated with a respective one of a plurality of printheads in an electrophotographic machine, each of the clock signals having a respective frequency; and
   using said printheads to create a plurality of raster lines, each said printhead being used to create the raster lines with a respective length, said length being dependent upon the frequency of the associated clock signal.

2. The method of claim 1 further comprising adjusting the frequencies of the clock signals such that each of the lengths of the raster lines are substantially equal.

3. The method of claim 2 further comprising measuring the lengths of the raster lines before adjusting the frequencies of the clock signals.

4. The method of claim 1 wherein at least two of the frequencies of the clock signals are different.

5. The method of claim 1 wherein the using of the printheads includes scanning light beams across at least one photosensitive surface in the machine at a substantially fixed rate of speed.

6. The method of claim 5 further comprising:
   feeding print data to each of said printheads at respective print speeds, each said respective print speed being dependent upon the frequency of the associated clock signal; and
   modulating the light beams dependent upon the print data.

7. The method of claim 6, further comprising transmitting the print data for each of said printheads to at least one memory device in the machine at a common transmission speed, the common transmission speed being one of greater than and equal to the print speeds, said feeding of the print data including retrieving the print data from said at least one memory device.

8. The method of claim 1 wherein each said raster line length is inversely proportional to the frequency of the associated clock signal.

9. An arrangement for use in an electrophotographic machine, comprising:
   a clock signal source configured to provide a plurality of clock signals, each of the clock signals having a respective frequency; and
   a plurality of printheads, each said printhead being associated with a respective one of said clock signals, each said printhead being configured to print raster lines having lengths dependent upon the frequency of the associated clock signal.

10. The arrangement of claim 9 further comprising a controller configured to adjust the frequencies of the clock signals such that the lengths of the raster lines are substantially equal.

11. The arrangement of claim 9 wherein at least two of the frequencies of the clock signals are different.

12. The arrangement of claim 9, further comprising at least one photosensitive surface, said printheads being configured to scan light beams across the at least one photosensitive surface at a fixed rate of speed.

13. The arrangement of claim 12 further comprising at least one lens, each of said light beams passing through said at least one lens and being magnified by said at least one lens at a respective level of magnification, said lengths of said raster lines being dependent upon said levels of magnification, said clock signal source comprising a means to compensate said lengths of said raster lines for said levels of magnification.

14. The arrangement of claim 9 further comprising at least one memory device configured to receive print data for each of said printheads at a common transmission speed, said printheads receiving the print data from said at least one memory device at respective print speeds, said print speeds being one of less than and equal to said common transmission speed.

15. The arrangement of claim 9 wherein said raster lines include a plurality of pixels, each said pixel having a width dependent upon the frequency of the associated clock signal.

16. A method comprising:
   modulating a plurality of light beams in an electrophotographic machine, said modulating of each said light beam being performed at a respective one of a plurality of modulating frequencies;
   scanning the light beams across at least one photosensitive surface to thereby produce a plurality of raster lines, each said raster line having a respective length; and
   adjusting said length of at least one of the raster lines by changing the modulating frequency of at least one of the light beams such that at least two of the modulating frequencies are unequal.

17. The method of claim 16 wherein the modulating of the light beams is dependent upon print data.

18. The method of claim 16 wherein the scanning of the light beams is performed only during the modulating of the light beams.

19. The method of claim 16 wherein the modulating frequency of at least one of the light beams is changed such that the lengths of all of the raster lines are substantially equal.

20. The method of claim 16 wherein said scanning is performed at a substantially fixed rate of speed.

\* \* \* \* \*